March 10, 1936.    M. C. SCHWAB    2,033,400
HYGIENIC CONTAINER
Original Filed Dec. 1, 1933

Inventor:
Martin C. Schwab
By James R. McKnight
   attorney.

Patented Mar. 10, 1936

2,033,400

UNITED STATES PATENT OFFICE 2,033,400

HYGIENIC CONTAINER

Martin C. Schwab, Chicago, Ill.

Original application December 1, 1933, Serial No. 700,433. Divided and this application September 19, 1934, Serial No. 744,634

11 Claims. (Cl. 215—32)

This is a divisional application from the original filed on December 1, 1933, Serial Number 700,433 for Hygienic container.

My invention relates to a sealed, glass, hygienic container or ampuls.

Among the objects of my invention are to provide a container so constructed that liquid may be withdrawn therefrom with the danger of contamination minimized; to supply an ampul with means for catching the broken glass and preventing it from falling into the liquid to be used, and such other objects, advantages and capabilities as will later more fully appear and which are inherently possessed by my invention.

Figure 1:
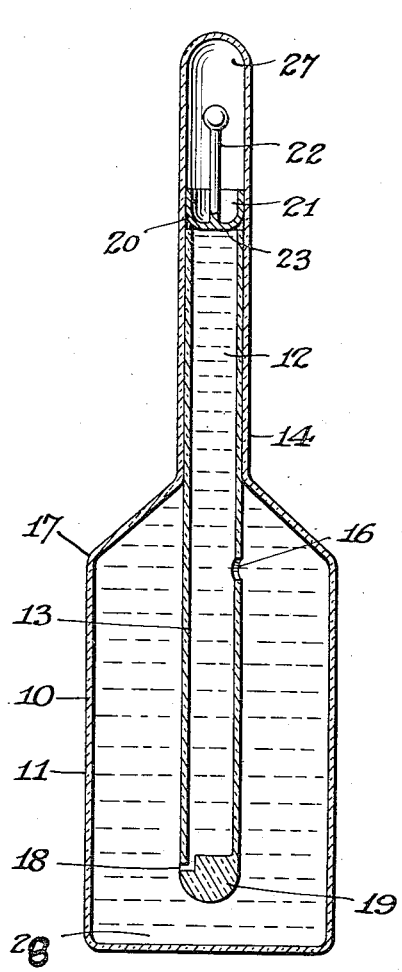
Figure 2:
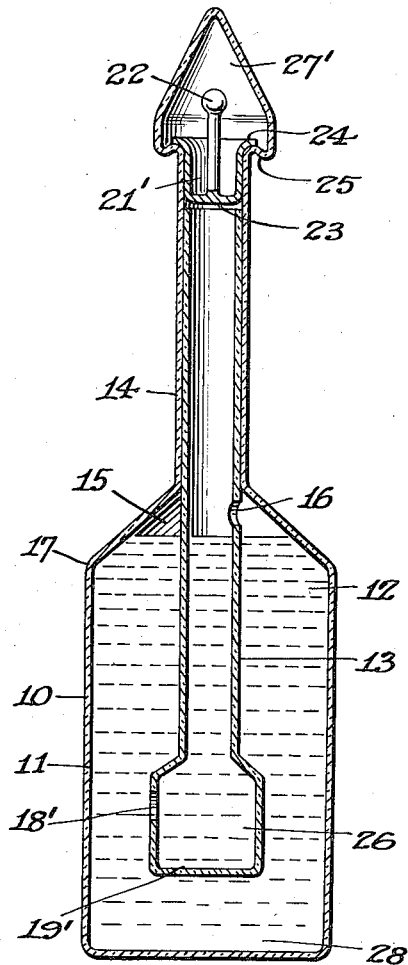

Referring to the drawing Fig. 1 is a front sectional view of my invention showing a floating trap and a narrow tube; Fig. 2 is a front sectional view showing a different form of trap and a tube having an enlarged bottom portion.

It is obvious, of course, that any one of the traps may be used with any one of the forms of tubes, and while I have shown herein preferred embodiments of my invention yet I wish it understood that the same are susceptible of modification and change without departing from the spirit of my invention.

My invention comprises a one piece, sealed, hollow, glass container 10 having a hollow body member 11 substantially filled with liquid 12. A tube 13 is connected to the inside of the neck 14 of the container 10 and extends down into the body member 11 but ends short of the bottom of the container 10. An air or vacuum space 15 is left above the normal liquid level in the container. The tube 13 has on one side thereof an air inlet 16 adjacent the level of the shoulders 17 of the container, and a liquid inlet 18 at its lower end and on the side opposite the air inlet 16. A stop member 19 or 19' is placed within the tube 13 at the bottom thereof and adjacent the liquid inlet 18. Placed in the neck 14 is a trap 20 which has a receiving portion 21 in Fig. 1 and 21' in Fig. 2, and a handle 22. The trap 20 floats on the liquid as shown in Fig. 1. The trap may also be provided with an anchor 23. Another embodiment instead of floating is held by arms 24 to turns 25 within the neck 14.

As shown in Fig. 2 the tube 13 may have an enlarged lower portion 26 with the liquid inlet 18' at the side opposite the air inlet 16.

In use my invention is particularly applicable to ampuls or phials filled with medicated solution. The container 10 is ordinarily of sealed glass and is opened by breaking the top 27 or 27' of the neck 14. In the sealed glass containers heretofore used there is the likelihood of glass particles from the breaking of the top falling into the container and contaminating the liquid therein. With my invention the trap 20 positioned above and covering the liquid receives any glass particles so dropped into its receiving portion 21. The trap having served its purpose is then removed by using handle 22. The ampul is then ready for the withdrawal of the liquid contained therein. Ordinarily such liquid is used for intravenous or subcutaneous injections and it is important that every precaution be taken to insure a pure solution. The air coming in the neck 14 presses down through air inlet 16 and forces liquid into liquid inlet 18 into tube 13. The user inserts his needle into tube 13 for the withdrawal of solution for the injection. Any foreign bodies in the liquid will tend to sink to the bottom of the container which acts as a sediment chamber 28. Other foreign bodies, if lighter, would float on the surface of the liquid. It is, therefore, apparent that the safest place for the withdrawal of liquid would be above the sediment chamber 28 and below the top of the liquid. My tube 13 accomplishes this result by ending short of the bottom of the container and having the liquid inlet 18 above this point and, of course, below the liquid level. The stop member 19 prevents the needle from touching or withdrawing liquid from the sediment chamber 28. Since all of the liquid is never used my tube insures the withdrawal of that portion of the liquid which has the least likelihood of containing foreign bodies. Therefore, my invention minimizes the danger of contamination.

The enlarged lower portion 26 of the tube 13 increases the capacity of the tube so that a greater amount of liquid may be withdrawn by one insertion of a needle. The enlarged portion if only partly filled at the time the ampul is filled may act to receive liquid which has expanded by the heat. The bottom of the enlarged portion 26 may also act as a secondary sediment chamber, and of course as a stop member.

Having thus described my invention, I claim:

1. An ampul from which liquid may be hygienically withdrawn comprising a hollow body member having a neck and a sealed breakable top integral with said body member and neck, a tube connected to the neck of said body member and extending downwardly to a point above the bottom of said body member, said tube having a closed bottom, and side openings for air and liquid, said tube adapted to receive an inserted needle for the withdrawal of liquid and to prevent the withdrawal of liquid at both the bottom and top level of said body member, and a removable trap within the neck of said ampul for catching and holding any particles of glass which fall within said ampul after the top of said ampul has been broken.

2. An ampul from which liquid may be hygienically withdrawn comprising a hollow body member having a neck, a sealed breakable top integral with said body member and neck, a tube connected to the neck of said body member and leading downwardly to a point above the bottom of said body member, said tube having a single air inlet adjacent the top of said tube and on the side thereof and a single liquid inlet adjacent the bottom of said tube and on the opposite side of said air inlet, said tube adapted to receive a needle inserted therein for the hygienic withdrawal of liquid therefrom, a bottom portion to said body member for receiving as a sediment chamber foreign bodies in the liquid, said bottom portion being below the level of the liquid inlet in the tube so that said liquid in said bottom portion cannot enter the tube and be withdrawn, and a removable trap within the neck of said ampul for catching and holding any particles of glass which fall within said ampul after the top of said ampul has been broken.

3. An ampul from which liquid may be hygienically withdrawn comprising a hollow body member having a neck, a sealed breakable top integral with said body member and neck, a tube having an enlarged lower portion, said tube connected to the neck of said body member and leading downwardly to a point above the bottom of said body member, said tube having a single air inlet adjacent the top of said tube and on the side thereof and a single liquid inlet adjacent the bottom of said tube and on the opposite side to said air inlet, said tube adapted to receive a needle inserted therein for the hygienic withdrawal of liquid therefrom, a bottom portion to said body member for receiving as a sediment chamber foreign bodies in the liquid, said bottom portion being below the level of the liquid inlet in the tube so that said liquid in said bottom portion cannot enter the tube and be withdrawn, and a removable trap within the neck of said ampul for catching and holding any particles of glass which fall within said ampul after the top of said ampul has been broken.

4. An ampul comprising a hollow body member having a neck, a sealed breakable top integral with said body member and neck, a tube within said body member having an opening adjacent its upper end, said tube having a closed enlarged portion adjacent its bottom end, said opening adjacent the upper end closed by the neck of said ampul until the tube is inserted further within the ampul when said opening is exposed, and a removable trap within the neck of said ampul for catching and holding any particles of glass which fall within said ampul after the top of said ampul has been broken.

5. An ampul from which liquid may be hygienically withdrawn comprising a hollow body member having a neck and a sealed breakable top integral with said body member and neck, a tube connected to the neck of said body member and extending downwardly to a point above the bottom of said body member, said tube having a closed bottom, and side openings for air and liquid, said tube adapted to receive an inserted needle for the withdrawal of liquid and to prevent the withdrawal of liquid at both the bottom and top level of said body member.

6. An ampul from which liquid may be hygienically withdrawn comprising a hollow body member having a neck and a sealed breakable top integral with said body member and neck, a tube connected to the neck of said body member and leading downwardly to a point above the bottom of said body member, said tube having a single air inlet adjacent the top of said tube and on the side thereof and a single liquid inlet adjacent the bottom of said tube and on the opposite side of said air inlet, said tube adapted to receive a needle inserted therein for the hygienic withdrawal of liquid therefrom and a bottom portion to said body member for receiving as a sediment chamber foreign bodies in the liquid, said bottom portion being below the level of the liquid inlet in the tube so that said liquid in said bottom portion cannot enter the tube and be withdrawn.

7. An ampul from which liquid may be hygienically withdrawn comprising a hollow body member having a neck and a sealed breakable top integral with said body member and neck, a tube connected to the neck of said body member and leading downwardly to a point above the bottom of said body member, said tube having a single air inlet adjacent the top of said tube and on one side thereof and a single liquid inlet adjacent the bottom of said tube and on the side opposite to said air inlet, said tube adapted to receive a needle inserted therein for the hygienic withdrawal of liquid therefrom, and a bottom portion to said body member for receiving as a sediment chamber foreign bodies in the liquid, said bottom portion being below the level of the liquid inlet in the tube so that said liquid in said bottom portion cannot enter the tube and be withdrawn, and a stop member closing the bottom of the tube for preventing an instrument from passing through the bottom of said tube and withdrawing liquid from said sediment chamber.

8. A hygienic container for liquid comprising a hollow body member having a neck and a seal breakable top integral with said body member and neck, a tube connected to the neck of said body member so that liquid in the container cannot be withdrawn from its top level through said tube, said tube extending down into said body member to a point above the bottom thereof, a stop member closing the bottom of said tube, said tube having an air inlet and a liquid opening, said body member having a bottom portion adapted to impound foreign bodies sunk therein as a sediment chamber, said stop member adapted to prevent the withdrawal of liquid from the sediment chamber.

9. An ampul from which liquid may be hygienically withdrawn comprising a hollow body member having a neck and a sealed breakable top integral with said body member and neck, a tube having an enlarged lower portion, said tube connected to the neck of said body member and leading downwardly to a point above the bottom of said body member, said tube having a single air inlet adjacent the top of said tube and on the side thereof and a single liquid inlet adjacent the bottom of said tube and on the side opposite to said air inlet, said tube adapted to receive a needle inserted therein for the hygienic withdrawal of liquid therefrom, and a bottom portion to said body member for receiving as a sediment chamber foreign bodies in the liquid, said bottom portion being below the level of the liquid inlet in the tube so that said liquid in said bottom portion cannot enter the tube and be withdrawn.

10. An ampul from which liquid may be hygienically withdrawn comprising a hollow body member having a neck and a sealed breakable top integral with said body member and neck, a tube having an enlarged lower portion, said tube connected to the neck of said body member and leading downwardly to a point above the bottom of said body member, said tube having a single air inlet adjacent the top of said tube and on the side thereof and a single liquid inlet adjacent the bottom of said tube and on the side opposite to said air inlet, said tube adapted to receive a needle inserted therein for the hygienic withdrawal of liquid therefrom and a bottom portion to said body member for receiving as a sediment chamber foreign bodies in the liquid, said bottom portion being below the level of the liquid inlet in the tube so that said liquid in said bottom portion cannot enter the tube and be withdrawn, and a stop member closing the bottom of the tube for preventing an instrument from passing through the bottom of said tube and withdrawing liquid from said sediment chamber.

11. An ampul comprising a hollow body member having a neck, a sealed breakable top integral with said body member and neck, a tube within said body member having an opening adjacent its upper end, said tube having a closed enlarged portion adjacent its bottom end and having its upper end slidably mounted in said neck, said opening adjacent the upper end closed by the neck of said ampul until the tube is inserted further within the ampul when said opening is exposed.

MARTIN C. SCHWAB.